United States Patent [19]

Pilgrim, Jr. et al.

[11] Patent Number: 4,492,668
[45] Date of Patent: Jan. 8, 1985

[54] APPARATUS AND METHOD FOR PREVENTING THE ROTATION OF RODS USED IN NUCLEAR FUEL ASSEMBLIES

[75] Inventors: Lawrence G. Pilgrim, Jr.; Leigh F. Jackson, both of Greensburg, Pa.

[73] Assignee: Westinghouse Electric Corp., Pittsburgh, Pa.

[21] Appl. No.: 366,819

[22] Filed: Apr. 8, 1982

[51] Int. Cl.³ .............................................. G21C 23/00
[52] U.S. Cl. ..................................... 376/440; 376/442
[58] Field of Search ................................ 376/440, 442

[56] References Cited

U.S. PATENT DOCUMENTS

| | | | |
|---|---|---|---|
| 3,741,868 | 6/1973 | Qurnell | 376/440 |
| 3,864,211 | 2/1975 | King | 376/440 |
| 3,953,287 | 4/1976 | Long | 376/440 |

Primary Examiner—Donald P. Walsh
Attorney, Agent, or Firm—D. E. Erickson

[57] ABSTRACT

Apparatus and method for preventing the rotation of one or more elongated rods used in nuclear fuel assemblies include an end plug secured to one longitudinal end of such an elongated rod and having an out-of-cavity, non-round structure affixed thereto and configured to mate with a complementary shaped structure in a lower tie plate of a nuclear fuel assembly in such a manner as to prevent the rotation of the rod about its longitudinal axis. In one embodiment, the end plug includes a pair of flats formed on a portion of the end plug and configured to abut against a pair of flats formed on the outer surface of a cylindrical boss or sleeve of the lower tie plate, thereby to prevent the rotation of the rod. In another embodiment, four grooves, disposed 90° apart about the periphery of an end plug of a rod form a spline. The grooves are configured to receive four, radially inwardly protruding, key members disposed 90° apart about the periphery of a sleeve secured to the lower tie plate, thereby to prevent the rotation of the rod. In a further embodiment, a sleeve is secured to an end plug of a rod and includes four elongated slots disposed 90° apart about the periphery of the sleeve and configured in width, depth and spacing to receive and mate with four web portions of the lower tie plate of the nuclear fuel assembly, thereby to secure the rod against rotation about its longitudinal axis.

3 Claims, 10 Drawing Figures

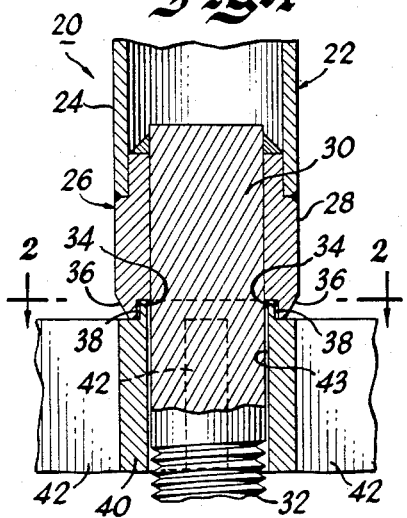
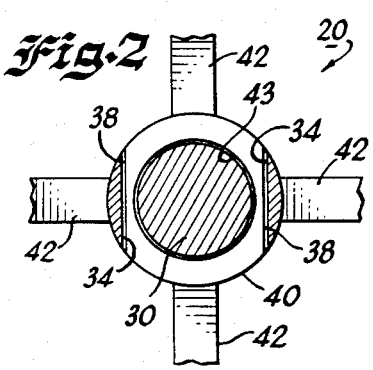
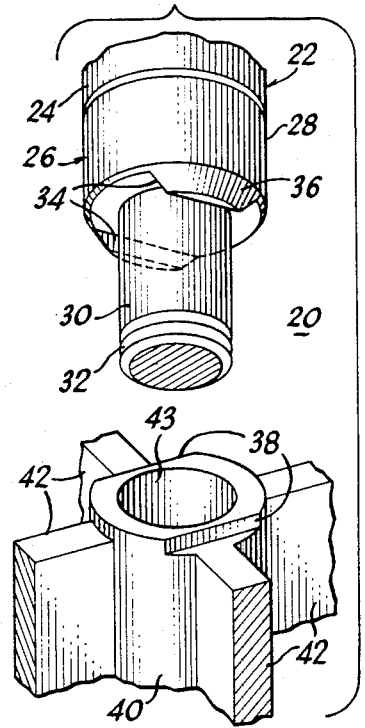

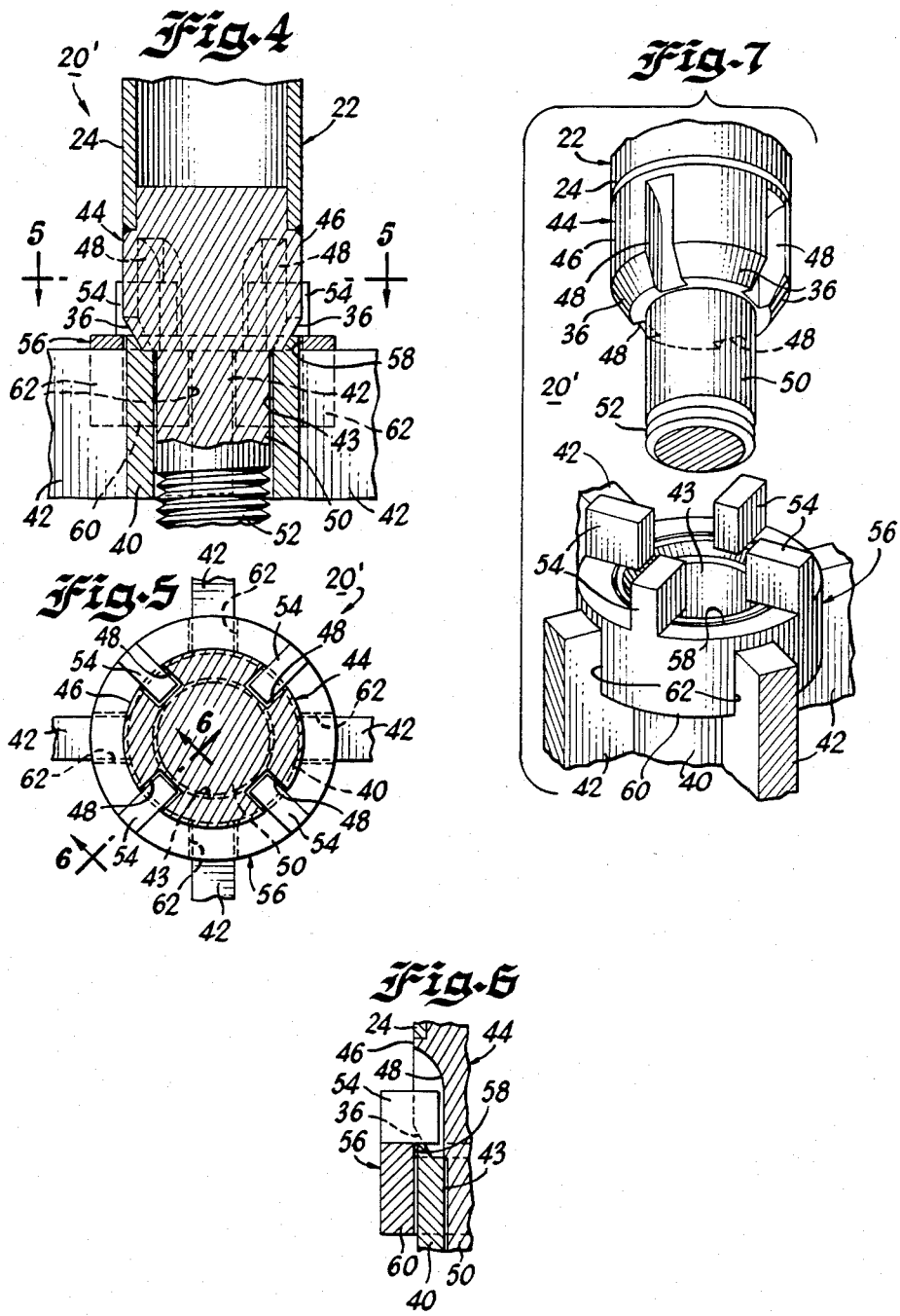

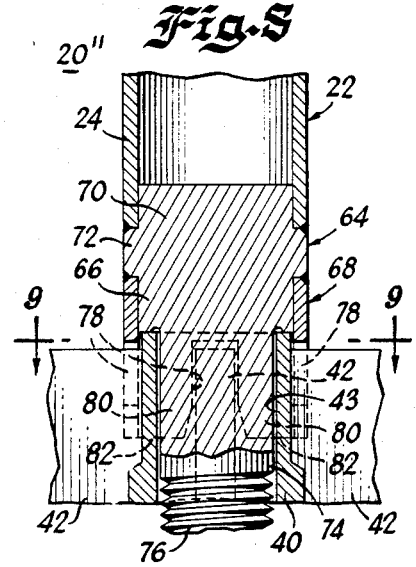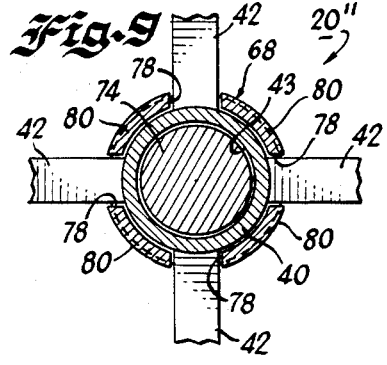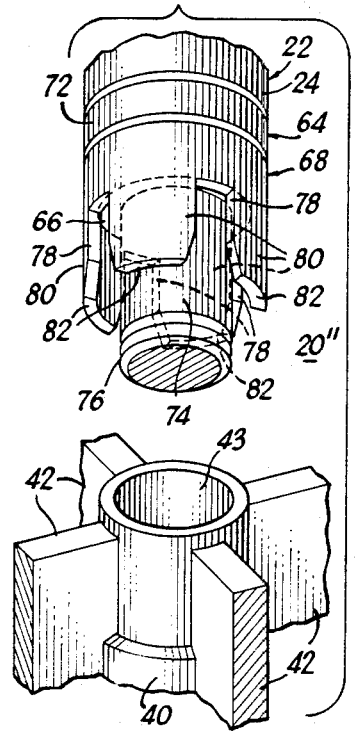

APPARATUS AND METHOD FOR PREVENTING THE ROTATION OF RODS USED IN NUCLEAR FUEL ASSEMBLIES

BACKGROUND OF THE INVENTION

1. Field of the Invention

The device of the present invention generally relates to nuclear fuel assemblies and, more particularly, to new and improved apparatus and methods for preventing the rotation about their longitudinal axes of elongated rods within nuclear fuel assemblies.

2. Description of the Prior Art

The generation of a large amount of heat energy through nuclear fission in a nuclear reactor is old and now well known. This energy is dissipated as heat in elongated nuclear fuel rods. A plurality of the nuclear fuel rods are grouped together to form separately removable nuclear fuel assemblies. A number of such nuclear fuel assemblies are typically arranged in a matrix to form a nuclear reactor core capable of a self-sustained, nuclear fission reaction. The core is typically submersed in a fluid, such as light water, that serves as a coolant for removing heat from the nuclear fuel rods and as a neutron moderator.

A typical fuel assembly may be formed by a 7×7 or an 8×8 array of spaced-apart, elongated rods supported between upper and lower tie plates, the rods normally being several feet in length, for example, from eight to fourteen feet in length, being approximately one-half inch in diameter and being typically spaced from one another by a fraction of an inch. In a typical boiling water reactor fuel assembly, the sixty-four rods that form the 8×8 array may be either sixty-four fuel rods or one or more non-fueled, water moderator rods with the remaining rods being fuel rods. In order to provide proper coolant flow past the fuel rods to remove the heat therefrom, the fuel rods are typically maintained in a fixed, spaced apart relationship and are restrained from excessive bowing and vibration during operation in the nuclear reactor core by a plurality of spacer grids that are spaced apart vertically along the longitudinal axis of the fuel assembly. Typically, structure is provided within the fuel assembly for maintaining the spacer grids in their respective vertical or axial positions along the longitudinal axis of the fuel assembly. For example, U.S. Pat. Nos. 3,350,275 and 3,466,226 disclose the use of fuel rods, commonly referred to as spacer capture fuel rods, for maintaining the position of the spacer grids within the fuel assembly. U.S. Pat. No. 3,802,995 discloses the use of a non-fueled, water moderator rod, commonly referred to as a spacer capture water rod, for maintaining the axial position of the spacer grids within the fuel assembly.

Typically, the spacer capture rod, whether a fuel rod or a water moderator rod, includes one or more projecting portions formed thereon and located at each spacer grid axial location for engagement with or for limiting the movement of the spacer grids at their respective axial locations. Such projections are configured to pass through one cell of each spacer grid, typically located in or near the center of the spacer grid, when the spacer capture rod is positioned at a first rotational orientation with respect to the longitudinal axis of the spacer capture rod. Subsequently, by rotating the spacer capture rod about its longitudinal axis through a fixed angle, for example, an angle of 45°, the projecting portions of the spacer capture rod will engage or coact with the spacer grids at each axial location to prevent or limit the axial movement of the spacer grids. See, as an example, FIGS. 8–12 of the above-mentioned '995 patent. Thus, it becomes important to prevent the subsequent rotation of the spacer capture rod about its longitudinal axis in order to prevent the disengagement of the projecting portions of the spacer capture rod from the spacer grids.

The lower end plug of the spacer capture rod disclosed in the above-mentioned '995 patent includes an extension with a square cross section adapted to fit in a special cavity of a complementary or mating shape in the lower tie plate of the fuel assembly to prevent the rotation of the spacer capture rod. Such an "in-cavity" anti-rotation scheme entails its own set of problems, for example, the possible necessity for accurately machining the inner walls of a sleeve in the tie plate, that may be undesirable for many applications.

SUMMARY OF THE INVENTION

An object of the present invention is to provide a new and improved spacer capture rod in a nuclear fuel assembly.

Another object of the present invention is to provide a new and improved method and apparatus for preventing the rotation of an elongated rod, such as a spacer capture rod, in a nuclear fuel assembly.

Another object of the present invention is to provide a new and improved out-of-cavity method and apparatus for preventing the rotation of an elongated rod such as a spacer capture rod, in a nuclear fuel assembly.

Briefly, the apparatus and method of the present invention for preventing the rotation of one or more elongated rods in a nuclear fuel assembly involve the use of an end plug secured to one longitudinal end of an elongated rod, such as a spacer capture rod. The end plug includes an out-of-cavity, non-round structural portion affixed thereto and configured to mate with a complementarily shaped structural portion of a lower tie plate of the nuclear fuel assembly in such a manner as to prevent the rotation of the spacer capture rod about its longitudinal axis. In one embodiment, the end plug includes a pair of flats formed on a portion of the end plug and configured to abut against a pair of flats formed on the outer surface of a cylindrical boss or sleeve of the tie plate, thereby to prevent the rotation of the spacer capture rod. In anther embodiment, four grooves, disposed 90° apart about the periphery of the end plug of a spacer capture rod, form, in essence, a spline. The grooves are configured to receive four, radially inwardly protruding, key members disposed 90° apart about the periphery of a sleeve secured to the lower tie plate, thereby to prevent the rotation of the spacer capture rod. In a third embodiment, a sleeve is secured to the end plug of a spacer capture rod and includes four elongated slots disposed 90° apart about the periphery of the sleeve and configured in width, depth and spacing to receive and mate with four web portions of the lower tie plate of the nuclear fuel assembly, thereby to secure the spacer capture rod against rotation.

These embodiments of the present invention utilize an out-of-cavity anti-rotation scheme to prevent the rotation about its longitudinal axis of an elongated rod of a nuclear fuel assembly. The term "out-of-cavity" anti-rotation apparatus, device, means, method or scheme is used herein to refer to an apparatus, device, means, method or scheme for preventing the rotation about its longitudinal axis of an elongated rod, whether a spacer capture rod, fuel rod or any other elongated rod of a nuclear fuel assembly, in which the structure utilized to prevent the rotation of the rod is physically located outside of the cylindrical sleeve or boss typically appearing at the intersection of elongated web portions of a lower tie plate in a nuclear fuel assembly.

BRIEF DESCRIPTION OF THE DRAWING

The above and other objects and advantages and novel features of the present invention will become apparent from the following detailed description of the embodiment of the invention illustrated in the accompanying drawing wherein:

FIG. 1 is a fragmentary cross sectional view depicting a device for preventing the rotation about its longitudinal axis of an elongated rod in a nuclear fuel assembly, constructed in accordance with the principles of the present invention;

FIG. 2 is a cross sectional view of the device of FIG. 1 taken along line 2—2 of FIG. 1;

FIG. 3 is a fragmentary, broken away, perspective view of the device of FIG. 1;

FIG. 4 is a cross sectional view of an alternative embodiment of a device for preventing the rotation about its longitudinal axis of an elongated rod in a nuclear fuel assembly, constructed in accordance with the principles of the present invention;

FIG. 5 is a cross sectional view of the device of FIG. 4 taken along 5—5 of FIG. 4;

FIG. 6 is a fragmentary, cross sectional view of a portion of the device of FIG. 4 taken along line 6—6 of FIG. 5;

FIG. 7 is a fragmentary, broken away, perspective view of the device of FIG. 4;

FIG. 8 is a fragmentary, cross sectional view of a further alternative embodiment of a device for preventing the rotation about its longitudinal axis of an elongated rod of a nuclear fuel assembly, constructed in accordance with the principles of the present invention;

FIG. 9 is a cross sectional view of the device of FIG. 8 taken along line 9—9 of FIG. 8; and FIG. 10 is a fragmentary, broken away, perspective view of the device of FIG. 8.

DESCRIPTION OF THE PREFERRED EMBODIMENT

Referring to the drawing and initially to FIGS. 1-3, there is illustrated a new and improved device or apparatus 20 and method for preventing the rotation of an elongated rod 22 about its longitudinal axis in a nuclear fuel assembly. The elongated rod 22 is disposed between spaced-apart plates of the nuclear fuel assembly, for example, an upper tie plate and a lower tie plate, and may be a spacer capture fuel rod, a spacer capture water moderator rod, a spacer capture rod other than a fuel rod or a water moderated rod, a fuel rod, a water moderator rod, or any other elongated rod in a nuclear fuel assembly. The rod 22 includes a thin wall cylindrical tube 24 that is normally terminated at its upper end by an upper end plug (not illustrated).

The device 20 includes a lower end plug 26 that is welded to and terminates the lower end of the tube 24. The lower end plug 26 is of a two-piece construction consisting of a cylindrical body 28 that is welded to the lower end of the tube 24 and a stud portion or member 30 having a threaded lower end 32 for receipt of locking or retaining means, such as a locking or retaining nut or washer (not illustrated). The stud member 30 may be joined to the cylindrical body 28 by any convenient means, such as welding. The cylindrical body includes a pair of diametrically oppositely disposed, longitudinally extending, internal flat portions or flats 34 formed at the lowermost end of the cylindrical body 28. The outer surface of the flats 34 is tapered radially or chamfered to provide lead in surfaces 36 to facilitate the insertion of the rod 22 through the cells of the spacer grids during the assembly of the nuclear fuel assembly.

In accordance with an important feature of the present invention, the flats 34 are configured to seat against and engage a pair of diametrically oppositely disposed, elongated external or out-of-cavity flat portions or flats 38 formed on the upper outer surface of a cylindrical boss or sleeve 40 of a lower tie plate of a nuclear fuel assembly positioned at the intersection of four, transversely disposed, elongated, web portions or members 42 of a lower tie plate of a nuclear fuel assembly. The circumferentially enclosed cylindrical boss or sleeve 40 also includes a circumferentially enclosed internal cavity 43 through which the lower portion of the stud member 30, including its threaded lower end 32, passes for subsequent retention therein by the receipt of suitable locking or retaining means. Thus, the rod 22 may be secured to the lower tie plate of the nuclear fuel assembly in such a manner as to prevent its rotation about its longitudinal axis by the receipt of the stud portion 30 within the cavity 43 of the sleeve 40 such that the flats 34 seat against and engage the flats 38 disposed outside of the cavity 43 of the sleeve 40. Subsequently, locking means, such as a retaining nut (not illustrated), is installed in engagement with the threaded lower end 32 of the stud portion 30 to retain the flats 34 seated against and in engagement with the flats 38, thereby to prevent the rotation of the rod 22 about its longitudinal axis.

In accordance with an important feature of the present invention, an alternate embodiment of a device 20' (FIGS. 4-7) for preventing the rotation of an elongated rod 22 about its longitudinal axis includes a lower end plug 44 welded to the lower longitudinal end of the tube 24. Preferably, the lower end plug 44 is formed as a unitary member, although it could also be formed as a multiple-piece construction in the same manner as the lower end plug 26. The lower end plug 44 includes an upper cylindrical body portion 46 having four elongated grooves 48 formed therein that have longitudinal axes parallel to the longitudinal axes of the lower end plug 44 and of the rod 22. Preferably, the four grooves 48 are disposed 90° apart about the periphery of the body portion 46 to form a spline. The lowermost portion of the portion 46 is tapered radially or chamfered to provide lead in surfaces 36 to facilitate the insertion of the rod 22 through the cells of the spacer grids during the assembly of the nuclear fuel assembly. The lower end plug 44 further includes a lower elongated stud portion 50 of a reduced diameter, as compared to the body portion 46, terminating in a threaded lower end 52.

The grooves 48 are configured to receive and engage four, radially inwardly protruding, key members 54 disposed 90° apart at the upper end of an anti-rotation sleeve 56. The inner bore 58 of the anti-rotation sleeve 56 is preferably configured to be slightly larger than the outer diameter of the cylindrical boss or sleeve 40 disposed at the intersection of the four, transversely disposed, elongated, web portions or members 42. A lower end 60 of the sleeve 56 includes four, longitudinally extending, elongated slots 62 disposed 90° apart about the periphery of the sleeve 56 for the receipt of and the engagement by the web portions 42. Preferably, the sleeve 56 is secured to the lower tie plate of the fuel assembly by any convenient means, for example, by tack welding to the web portions 42.

The rod 22 may thus be secured to the lower tie plate of the nuclear fuel assembly in such a manner as to prevent its rotation about its longitudinal axis by the receipt of the stud portion 50 within the internal cavity 43 of the sleeve 40 such that the grooves 48 receive and engage the key members 54. Subsequently, locking means, such as a retaining nut (not illustrated), is installed in engagement with the threaded lower end 52 of the stud portion 50 to retain the key members 54 within and in engagement with the grooves 48, thereby to prevent the rotation of the rod 22 about its longitudinal axis.

In accordance with a further important feature of the present invention, a further alternative embodiment of a device 20'' (FIGS. 8-10) for preventing the rotation of an elongated rod 22 about its longitudinal axis includes a lower end plug 64 welded to the lower longitudinal end of the tube 24 of the elongated rod 22. The lower end plug 64 is of a two piece construction including a main body portion 66 and a cylindrical locking sleeve 68. The main body portion 66 includes an upper section 70 with a radially outwardly extending annular shoulder portion 72, the upper surface of which is welded to the tube 24 and the lower surface of which is welded to the locking sleeve 68. The main body portion 66 further includes a lower elongated stud portion 74 terminating in a threaded lower end 76.

The locking sleeve 68 has four elongated slots 78 formed therein that have longitudinal axes parallel to the longitudinal axes of the lower end plug 64 and of the rod 22. Preferably, the slots 78 are disposed 90° apart about the periphery of the lower portion of the sleeve 68 and are configured in width, depth and spacing to receive and mate with the four, transversely disposed, elongated, web portions or members 42 of the lower tie plate of the nuclear fuel assembly. The slots 78 are formed by and between four downwardly extending projections or fingers 80 of the sleeve 68. The fingers 80 include lowermost end surfaces 82.

The rod 22 may thus be secured to the lower tie plate of the nuclear fuel assembly in such a manner as to prevent its rotation about its longitudinal axis by the receipt of the stud portion 74 within the inner bore 43 of the sleeve 40 such that the slots 78 receive and engage the web members 42 such that the fingers 80 are disposed between the web members 42. Subsequently, locking means, such as a retaining nut (not illustrated), is installed in engagement with the threaded lower end 76 of the stud portion 74 to retain the web members 42 within and in engagement with the slots 78, thereby to prevent the rotation of the rod 22 about its longitudinal axis.

Obviously, many modifications and variations of the present invention are possible in light of the above disclosure. Thus, it is to be understood that, within the scope of the appended claims, the invention may be practiced otherwise than as specifically described above.

What we claim is:

1. An improved nuclear fuel assembly having a plurality of elongated rods with an end plug disposed at least at one longitudinal end of each of said rods and having at least one tie plate with a plurality of circumferentially enclosed cylindrical tie plate sleeves with one of said tie plate sleeves having a circumferentially enclosed internal cavity for receipt therethrough of one of said end plugs of one of said elongated rods, wherein the improvement comprises:
   (a) said one tie plate sleeve having a circumferential outer surface and an elongated out-of-cavity flat on an end portion of said outer surface; and
   (b) said one end plug having a stud portion disposable in said internal cavity of said one tie plate sleeve and having a cylindrical body portion disposed between said one elongated rod and said stud portion, said cylindrical body portion including a longitudinally extending, internal flat portion on the stud-portion-facing end of said cylindrical body portion, with said internal flat portion seatable against and surroundably engageable with said out-of-cavity flat to prevent rotation of said one elongated rod about its longitudinal axis when said stud portion of said one end plug is disposed in said internal cavity of said one tie plate sleeve.

2. The improved nuclear fuel assembly of claim 1, wherein said one tie plate sleeve also includes an additional out-of-cavity flat generally identical with, and diametrically oppositely disposed from, said out-of-cavity flat, and wherein said cylindrical body portion of said one end plug further includes an additional internal flat portion generally identical with, and diametrically oppositely disposed from, said internal flat portion.

3. The improved nuclear fuel assembly of claim 1, wherein said internal flat portion has a radially tapered outer surface.

* * * * *